United States Patent
Dallos, Jr. et al.

(10) Patent No.: US 9,969,257 B2
(45) Date of Patent: May 15, 2018

(54) ELASTICALLY AVERAGED VEHICLE DOOR ASSEMBLY

(71) Applicant: GM GLOBAL TECHNOLOGY OPERATIONS LLC, Detroit, MI (US)

(72) Inventors: Robert Dallos, Jr., Canton, MI (US); Gordan N. Noll, St. Clair Shores, MI (US); Jennifer P. Lawall, Waterford, MI (US); Steven E. Morris, Fair Haven, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/232,351

(22) Filed: Aug. 9, 2016

(65) Prior Publication Data

US 2018/0043768 A1 Feb. 15, 2018

(51) Int. Cl.
*B60K 15/05* (2006.01)
*B60L 11/18* (2006.01)
*E05D 7/00* (2006.01)

(52) U.S. Cl.
CPC .......... *B60K 15/05* (2013.01); *B60L 11/1818* (2013.01); *E05D 7/00* (2013.01); *B60K 2015/053* (2013.01); *E05Y 2900/534* (2013.01)

(58) Field of Classification Search
CPC ........ B60K 15/05; B60L 11/1818; E05D 7/00
USPC ....................................... 296/97.22
See application file for complete search history.

(56) References Cited

U.S. PATENT DOCUMENTS

| | | | |
|---|---|---|---|
| 5,586,372 A | 12/1996 | Eguchi et al. | |
| 7,360,964 B2 | 4/2008 | Tsuya et al. | |
| 2008/0094447 A1 | 4/2008 | Drury | |
| 2013/0019455 A1* | 1/2013 | Morris | B25B 27/00 |
| | | | 29/466 |
| 2015/0283898 A1* | 10/2015 | Morris | E05F 7/005 |
| | | | 49/386 |

* cited by examiner

*Primary Examiner* — Joseph D. Pape
(74) *Attorney, Agent, or Firm* — Cantor Colburn LLP

(57) ABSTRACT

A vehicle fuel door assembly includes a cover comprising a plurality of alignment features fixedly disposed relative to the cover, the plurality of alignment features formed of an elastically deformable material. The assembly also includes a hinge comprising a plurality of alignment elements fixedly disposed relative to the hinge, each of the alignment features interferingly, deformably and matingly engageable with a respective alignment element, the alignment features elastically deforming to an elastically averaged final configuration that aligns the cover relative to the hinge in six planar orthogonal directions by averaging the elastic deformation of the respective alignment features.

16 Claims, 3 Drawing Sheets

US 9,969,257 B2

ELASTICALLY AVERAGED VEHICLE DOOR ASSEMBLY

FIELD OF THE INVENTION

The subject invention relates to the art of alignment systems and assemblies and, more particularly, to elastically deformable alignment assemblies for fuel door and charge port door assemblies for vehicles.

BACKGROUND

Currently, components, particularly vehicular components such as those found in automotive vehicles, which are to be mated together in a manufacturing process are mutually located with respect to each other by alignment features that are oversized and/or undersized to provide spacing to freely move the components relative to one another to align them without creating an interference therebetween that would hinder the manufacturing process. One example includes two-way and/or four-way male alignment features, typically upstanding bosses, which are received into corresponding female alignment features, typically apertures in the form of holes or slots. There is a clearance between the male alignment features and their respective female alignment features which is predetermined to match anticipated size and positional variation tolerances of the male and female alignment features as a result of manufacturing (or fabrication) variances. As a result, significant positional variation can occur between the mated first and second components having the aforementioned alignment features, which may contribute to the presence of undesirably large variation in their alignment, particularly with regard to the gaps and spacing between them. In the case where these misaligned components are also part of another assembly, such misalignments can also affect the function and/or aesthetic appearance of the entire assembly. Regardless of whether such misalignment is limited to two components or an entire assembly, it can negatively affect function and result in a perception of poor quality.

SUMMARY OF THE INVENTION

In one embodiment of the invention, a vehicle fuel door assembly includes a cover comprising a plurality of alignment features fixedly disposed relative to the cover, the plurality of alignment features formed of an elastically deformable material. The assembly also includes a hinge comprising a plurality of alignment elements fixedly disposed relative to the hinge, each of the alignment features interferingly, deformably and matingly engageable with a respective alignment element, the alignment features elastically deforming to an elastically averaged final configuration that aligns the cover relative to the hinge in six planar orthogonal directions by averaging the elastic deformation of the respective alignment features.

In another embodiment of the invention, a charge port door assembly includes a cover comprising a plurality of alignment features fixedly disposed relative to the cover, the plurality of alignment features formed of an elastically deformable material. The assembly also includes a hinge comprising a plurality of alignment elements fixedly disposed relative to the hinge, each of the alignment features interferingly, deformably and matingly engageable with a respective alignment element, the alignment features elastically deforming to an elastically averaged final configuration that aligns the cover relative to the hinge in six planar orthogonal directions by averaging the elastic deformation of the respective alignment features.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
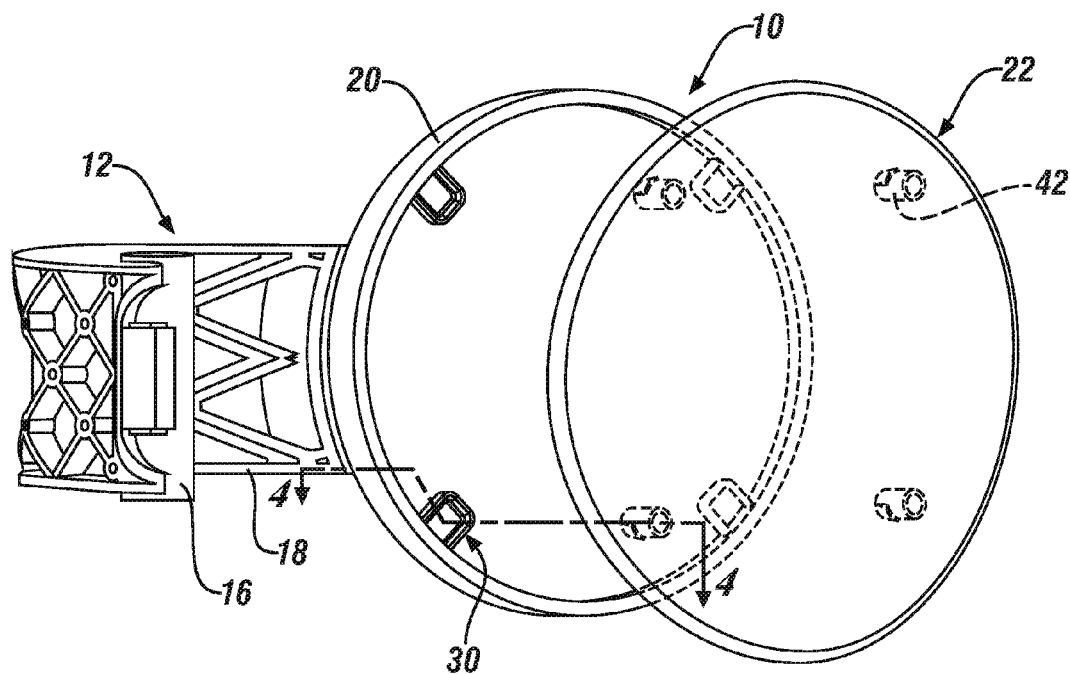
FIG. 1 is a perspective view of a door assembly in a pre-assembled condition.

The following description is merely exemplary in nature and is not intended to limit the present disclosure, its application or uses. For example, the embodiments shown comprise vehicle components but the alignment system may be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min} = X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. In some embodiments, the elastically deformable component configured to have the at least one feature and associated mating feature disclosed herein may require more than one of such features, depending on the requirements of a particular embodiment. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, now U.S. Pat. No. 8,695,201, the disclosure of which is incorporated by reference herein in its entirety. The embodiments disclosed above provide the ability to convert an existing component that is not compatible with the above-described elastic averaging principles, or that would be further aided with the inclusion of an elastically averaged alignment and retention system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled, towed, or movable conveyance suitable for transporting or supporting a burden.

Figure 6:
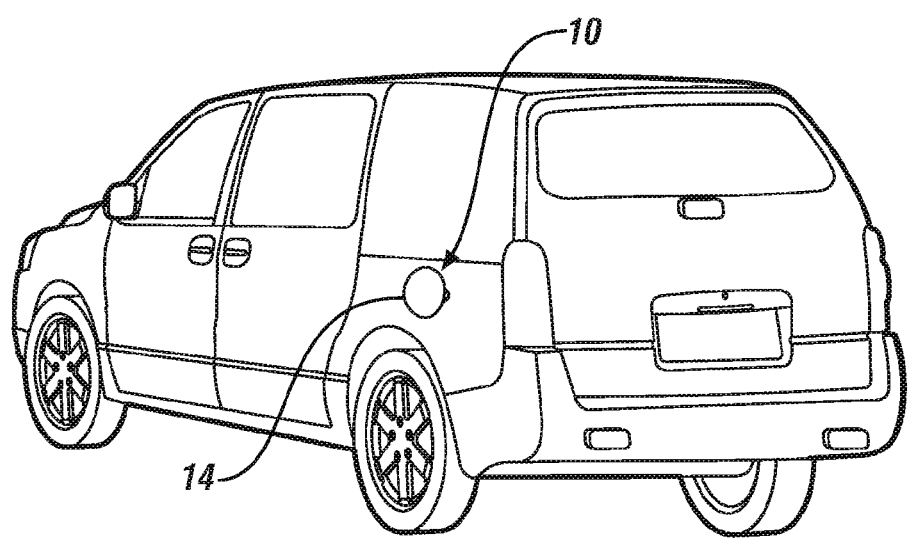
FIG. 6 is a perspective view of a vehicle having the door assembly.

Referring to FIG. 1, an elastically averaged alignment assembly is illustrated and referenced generally with numeral 10. The elastically averaged alignment assembly 10 comprises a door assembly for a vehicle in some embodiments. For example, the assembly is a vehicle fuel door assembly in one embodiment and a vehicle charge port door assembly in another embodiment, as shown in FIG. 6. Irrespective of whether the door assembly is a fuel door assembly or a charge port door assembly, the assembly 10 includes a hinge 12 that is pivotably coupled to the vehicle within a housing 14 (FIG. 6). In particular, the hinge 12 includes a hinge segment 16 that is operatively coupled to a structure within the housing 14 (FIG. 6) in a pivotable manner. Extending from the hinge segment 16 is a connector segment 18 that fixedly connects the hinge segment 16 to a hinge wall 20. The hinge 12 is a molded structure that may be formed of any suitable material. The hinge 12 is pivotable between an open and a closed position to allow a user to selectively access the interior of the housing 14 (FIG. 6) to either introduce fuel into the vehicle or to plug in a charging device to power the vehicle.

Although described above as being coupled to the vehicle within the housing 14, the hinge 12 is connected directly to the body of the vehicle in some embodiments. Additionally, in some embodiments the hinge 12 may be part of, or installed to, a four-bar linkage or the like to allow it to open and close in a non-pivotable manner.

As will be described herein, a cover 22 is operatively coupled to the hinge 12 to form an overall fuel door assembly or a charge port door assembly. More particularly, the cover 22 is operatively coupled to the hinge wall 20. FIG. 1 illustrates the hinge 12 and the cover 22 in a pre-assembled condition.

Figure 2:
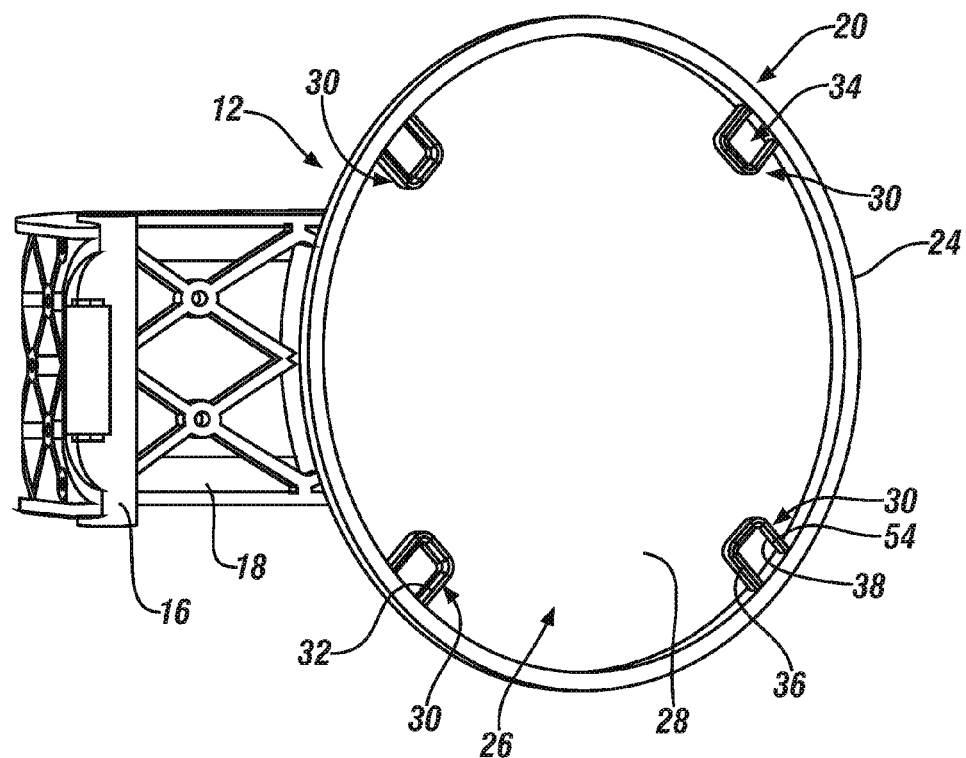
FIG. 2 is a perspective view of a hinge of the door assembly.

Referring now to FIG. 2, the hinge wall 20 includes a perimeter wall 24 that defines a perimeter of the hinge wall 20. In the illustrated embodiment, the hinge wall 20 is a substantially circular member, but it is to be appreciated that the hinge wall 20 may be formed of various alternative geometries, such as rectangular, oblong, etc. Regardless of the particular geometry, a pocket 26 of the hinge wall 20 is defined by a base wall 28 and the perimeter wall 24. The perimeter wall 24 extends from the base wall 28 toward a direction of engagement with the cover 22.

The pocket 26 provides a region for a plurality of alignment elements 30 to be disposed. The plurality of alignment elements 30 are receiving features for mating features of the cover 22, which will be described in detail herein. In the illustrated embodiment, there are four alignment elements, but it is to be appreciated that there may be more or fewer alignment elements. Each of the alignment elements 30 includes one or more walls 32 extending from the perimeter wall 24 to define an opening, or openings 34. In the illustrated embodiment, a single, U-shaped wall extends from the perimeter wall 24, but it is to be appreciated that alternative geometries may be employed to alter the shape of the opening 34. Each wall 32 includes an engagement end 36 and a retention end 38, with the retention end 38 being disposed closer to the base wall 28 of the pocket 26. A space 99 is present between the base wall 28 and the retention end 38 of the wall 32.

Figure 3:
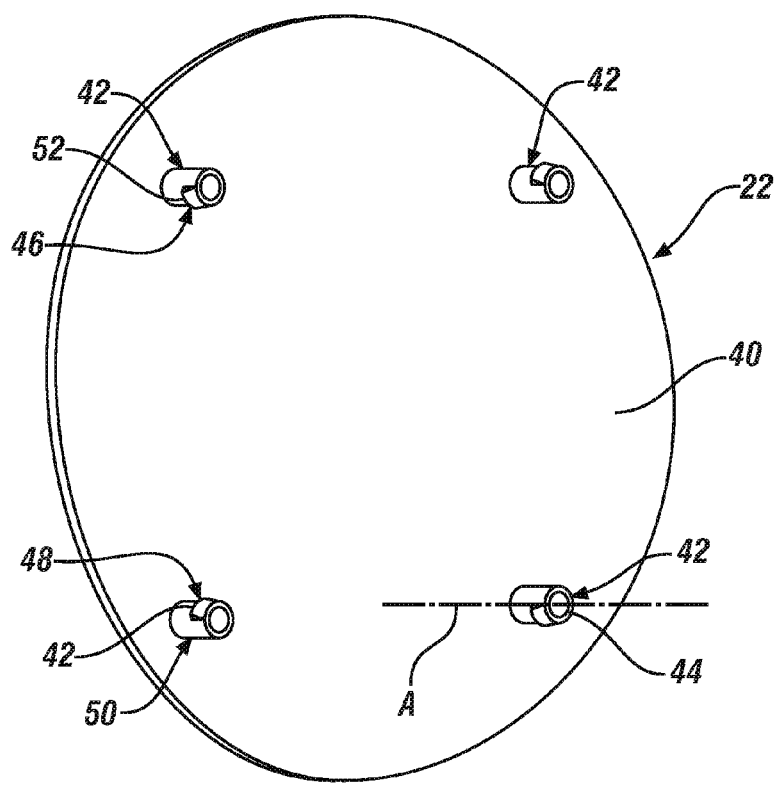
FIG. 3 is a perspective view of a cover of the door assembly.
Figure 4:
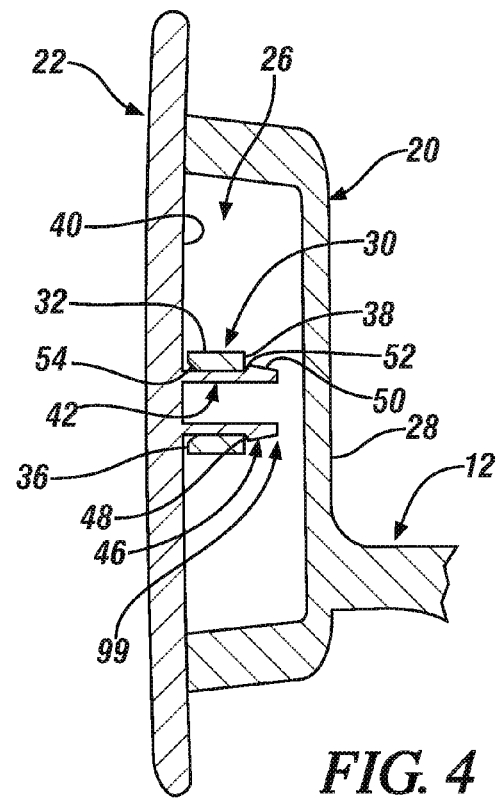
FIG. 4 is a sectional view of the cover and hinge in an assembled condition taken along line 4-4 of FIG. 1.

Referring now to FIGS. 3 and 4, the cover 22 is illustrated in greater detail. In some embodiments, the cover 22 has a geometry that substantially corresponds to the geometry of the hinge wall 20 to which it will be mated. As described in connection with the hinge wall 20, the cover 22 is a substantially circular member in the illustrated embodiment, but it is to be appreciated that the cover may be formed of various alternative geometries, such as rectangular, oblong, etc.

Regardless of the precise geometry, the cover 22 includes an interior surface 40. A plurality of alignment features 42 are fixedly connected to the cover 22 and extend substantially perpendicularly from a plane of the inner surface 40. The alignment features 42 are projections extending from the inner surface 40 to an end 44. In the illustrated embodiment, the alignment features 42 are tubular members that enhance flexibility of the alignment features 42, but it is contemplated that solid cylindrical members may be employed. Although the terms tubular and cylindrical are utilized above, it is to be understood that the alignment features 42 may have non-circular cross-sectional geometries.

Each of the alignment features 42 includes at least one retention feature 46. There may be a single retention feature 46 extending partially around the circumference of the alignment feature 42 or a plurality of retention features that each extends partially around the circumference. In other embodiments, a single retention feature extends around the entire circumference of the alignment feature 42. The retention feature(s) 46 includes a lip 48 extending substantially perpendicularly from a longitudinal axis A of the alignment feature 42. In the illustrated embodiment, a ramp 50 leads to an outer location 52 of the lip 48. The ramp 50 extends from proximate the end 44 of the alignment feature 42 in an outward direction from the alignment feature axis A and toward the interior surface 40 of the cover 22, with the ramp 50 terminating at the lip 48. The retention feature 46 may be positioned at any axial location located along the length of the alignment feature 42. In an embodiment, the ramp 50 extends from the end 44 to the lip 48.

Figure 5:
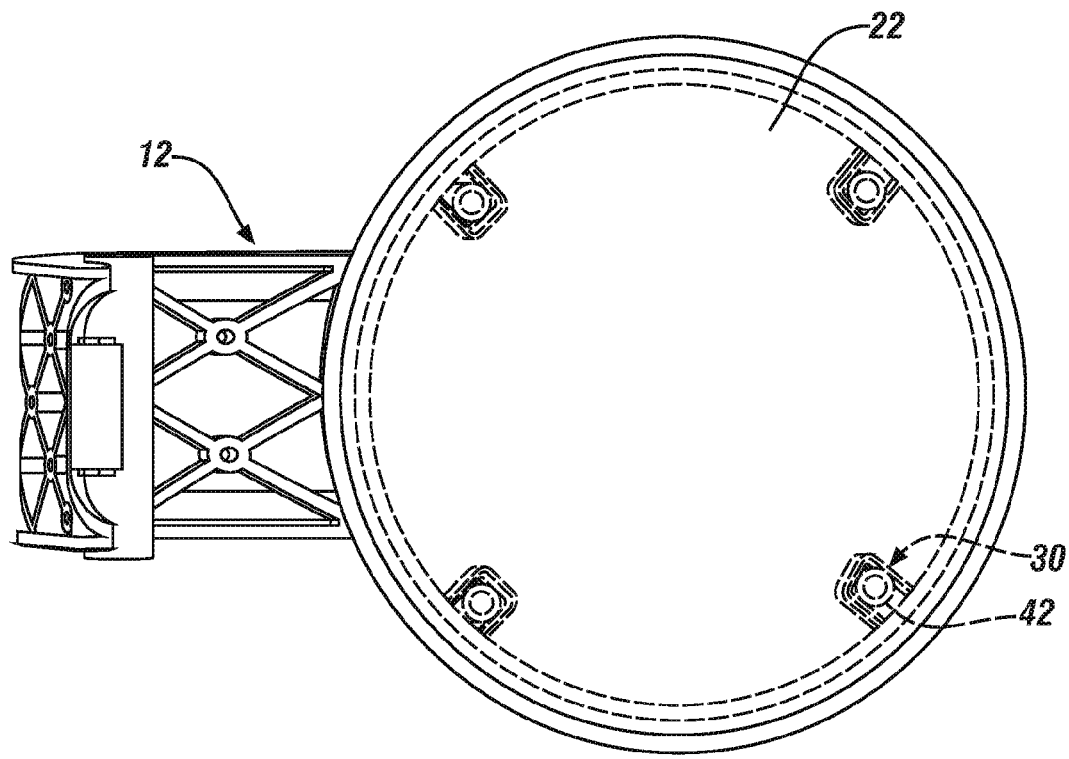
FIG. 5 is an elevation view of a the cover and the hinge in the assembled condition.

Referring now to FIGS. 4 and 5, an assembled hinge 12 and cover 22 is illustrated. The alignment elements 30 are configured to receive the alignment features 42 to couple the cover 22 to the hinge 12. In particular, the alignment features 42 are formed of an elastically deformable material and are sized to have at least one dimension (width, length, radius, perimeter, retention feature, etc.) greater than a corresponding dimension of the opening 34 of the respective alignment element 30. Such material and sizing ensure that when engaged with the wall 32 of the alignment element 30, the alignment feature 42 elastically deforms to an elastically averaged final configuration that aligns the cover 22 relative to the hinge wall 20 in six planar orthogonal directions, which is herein referred to as six-way alignment, by averaging the elastic deformation of the respective elastically deformable alignment features 42.

In some embodiments, the alignment elements 30 are also formed from an elastically deformable material to facilitate elastic deformation of the wall 32 during insertion of the alignment feature 42. The wall 32 may include an angled portion 54 (e.g., chamfer) at an initial engagement end of the wall 32 to guide the alignment feature 42 into the opening 34 during insertion (FIGS. 2 and 4).

As shown in FIG. 4, the alignment feature 42 is received within the opening 34 of the alignment element 30. Insertion is made until the lip 48 of the retention feature 46 passes completely through the opening 34 to reach a retention end 38 of the wall 32. Based on the elastically deformable nature of the alignment feature 42, as well as the greater dimension of the alignment feature 42 relative to the opening size, the portion of the alignment feature 42 with the retention feature 46 is deflected radially inwardly during insertion until the lip 48 passes over the retention end 38 of the wall 32. Subsequent to insertion sufficient to pass the lip 48 through the opening 34 completely, the lip contacts the retention end 38 of the wall 32 to prevent the alignment feature 42 from being withdrawn from the alignment element 30, thereby coupling the cover 22 to the hinge wall 20. In the illustrated assembled condition, the alignment features 42 are interferingly, deformably and matingly engaged with the alignment elements 30.

When the cover 22 and hinge 12 are components of a vehicle, an advantageous assembly results because the retention force, together with the elastic deformation of the alignment features 42, reduces the tendency of the components to vibrate or rattle against one another, and thus improves the noise, vibration and harshness (NVH) characteristics of the components and the vehicle in which they are installed. The engagement of the alignment elements 30 and the corresponding alignment features 42 also provides a stiffened interface between the cover 22 and the hinge 12. The assembly reduces or eliminates relative movement and precisely aligns the components due to the elastic averaging of deformation described above. Additionally, the precisely mated fit of the components improves aesthetics of the assembly, as well as the feel to a user.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle fuel door assembly comprising:
   a cover comprising a plurality of alignment features fixedly disposed relative to the cover, the plurality of alignment features being formed of an elastically deformable material; and
   a hinge comprising a plurality of alignment elements fixedly disposed relative to the hinge, each of the alignment features being interferingly, deformably and matingly engageable with a respective alignment element, the alignment features elastically deforming to an elastically averaged final configuration that aligns the cover relative to the hinge in six planar orthogonal directions by averaging the elastic deformation of the respective alignment features, the hinge comprising:
      a hinge segment pivotably coupled to a housing;
      a hinge wall, the hinge wall comprising a pocket defined by a base wall and at least one perimeter wall, wherein each of the plurality of alignment elements is an opening defined by the perimeter wall and a wall extending from the perimeter wall; and a connector segment connecting the hinge segment and the hinge wall.

2. The vehicle fuel door assembly of claim 1, wherein the wall is U-shaped.

3. The vehicle fuel door assembly of claim 1, wherein each of the plurality of alignment features comprises a projection extending in a longitudinal direction from a cover wall to an end.

4. The vehicle fuel door assembly of claim 3, wherein the projection comprises a retention feature extending perpendicularly relative to the longitudinal direction of the projection.

5. The vehicle fuel door assembly of claim 4, wherein the retention feature is located closer to the end of the projection than to the cover wall.

6. The vehicle fuel door assembly of claim 4, the projection comprising a plurality of retention features extending from the projection.

7. The vehicle fuel door assembly of claim 3, wherein each of the walls includes an angled portion at an initial engagement end of the wall to guide the projection into the opening.

8. The vehicle fuel door assembly of claim 4, wherein the retention feature is in contact with a retention end of each of the walls, and wherein the walls are spaced from the base wall of the pocket.

9. A charge port door assembly comprising:
- a cover comprising a plurality of alignment features fixedly disposed relative to the cover, the plurality of alignment features being formed of an elastically deformable material; and
- a hinge comprising a plurality of alignment elements fixedly disposed relative to the hinge, each of the alignment features being interferingly, deformably and matingly engageable with a respective alignment element, the alignment features elastically deforming to an elastically averaged final configuration that aligns the cover relative to the hinge in six planar orthogonal directions by averaging the elastic deformation of the respective alignment features, the hinge comprising:
  - a hinge segment pivotably coupled to a housing;
  - a hinge wall, the hinge wall comprising a pocket defined by a base wall and at least one perimeter wall, wherein each of the plurality of alignment elements is an opening defined by the perimeter wall and a wall extending from the perimeter wall; and
  - a connector segment connecting the hinge segment and the hinge wall.

10. The charge port door assembly of claim 9, wherein the wall is U-shaped.

11. The charge port door assembly of claim 9, wherein each of the plurality of alignment features comprises a projection extending in a longitudinal direction from a cover wall to an end.

12. The charge port door assembly of claim 11, wherein the projection comprises a retention feature extending perpendicularly relative to the longitudinal direction of the projection.

13. The charge port door assembly of claim 12, wherein the retention feature is located closer to the end of the projection than to the cover wall.

14. The charge port door assembly of claim 12, wherein the projection comprises a plurality of retention features extending from the projection.

15. The charge port door assembly of claim 11, wherein each of the walls includes an angled portion at an initial engagement end of the wall to guide the projection into the opening.

16. The charge port door assembly of claim 12, wherein the retention feature is in contact with a retention end of each of the walls, and wherein the walls are spaced from the base wall of the pocket.

* * * * *